United States Patent
Streit et al.

(10) Patent No.: US 6,964,188 B2
(45) Date of Patent: Nov. 15, 2005

(54) METHOD AND DEVICE FOR DETERMINING THE OFFSET VALUE OF A LONGITUDINAL ACCELERATION SENSOR

(75) Inventors: Andreas Streit, Markgroeningen (DE); Toni Braeuer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 10/718,085

(22) Filed: Nov. 19, 2003

(65) Prior Publication Data
US 2004/0099044 A1 May 27, 2004

(30) Foreign Application Priority Data
Nov. 21, 2002 (DE) .................... 102 54 296

(51) Int. Cl.$^7$ .................... G01P 15/125
(52) U.S. Cl. .................... 73/1.38
(58) Field of Search .................... 73/1.37, 1.38, 73/1.41; 702/87, 96

(56) References Cited

U.S. PATENT DOCUMENTS

| | | | |
|---|---|---|---|
| 6,212,462 B1 * | 4/2001 | Ohtsu et al. | 701/72 |
| 6,347,541 B1 * | 2/2002 | Maleki | |
| 6,601,431 B2 * | 8/2003 | Nagahara et al. | 73/1.38 |

FOREIGN PATENT DOCUMENTS

DE     100 41 444     3/2002

* cited by examiner

*Primary Examiner*—Robert Raevis
(74) *Attorney, Agent, or Firm*—Kenyon & Kenyon

(57) ABSTRACT

A method and device for determining the offset value of a longitudinal acceleration sensor,
    a first inclination variable representing the road surface inclination being determined from the output signal of the longitudinal acceleration sensor when the vehicle is standing still with the brake applied;
    a second inclination variable representing the road surface inclination and the vehicle acceleration being determined from the output signal of the longitudinal acceleration sensor after the brake is released following the vehicle standstill and the offset value of the longitudinal acceleration sensor being determined as a function of both inclination variables.

10 Claims, 2 Drawing Sheets

METHOD AND DEVICE FOR DETERMINING THE OFFSET VALUE OF A LONGITUDINAL ACCELERATION SENSOR

BACKGROUND INFORMATION

A method and a device for controlling wheel brakes of a vehicle are described in German Patent Application No. 100 41 444. In at least one operating state, braking force is maintained and/or built up on at least one wheel of the vehicle independently of the extent of pedal application. Such an operating state is present when the road surface gradient points in the direction of the future direction of travel of the vehicle and/or when the parking brake is applied. This functionality is also known under the term "hillholder" and includes an inclination sensor from which the gradient of the road surface and its direction is determined. Measures to monitor the inclination sensor and in particular the determination of its offset value are not found in German Patent Application No. 100 41 444.

SUMMARY OF THE INVENTION

The present invention relates to a method of determining the offset value of a longitudinal acceleration sensor that is installable in a vehicle, in which a first inclination variable representing the road surface inclination is determined from the output signal of the longitudinal acceleration sensor when the vehicle is standing still with the brake applied;

a second inclination variable representing the road surface inclination and the vehicle acceleration is determined from the output signal of the longitudinal acceleration sensor after the brake is released following the vehicle standstill, and the offset value of the longitudinal acceleration sensor is determined as a function of the two inclination variables.

An advantage of the present invention is that the determination of the offset value is essentially based on the output signals of the longitudinal acceleration sensor. This means that the monitoring of the sensor is essentially based on its own signals and it is not necessary to provide any additional signals of possibly redundant sensors. As a result, it is possible to implement the present invention in a very simple and cost-effective manner.

The offset value of the inclination sensor or longitudinal acceleration sensor is the value of the sensor represented by its output signal when the vehicle (and accordingly the sensor) is in a horizontal position (level road surface) and in a non-accelerating state. Ideally, this value is identical to zero, since there is no longitudinal inclination of the road surface and no acceleration. As a result of component tolerances and additional influences, however, this value is different from zero. This shift in relation to zero is described as an offset value. The terms "inclination sensor" and "longitudinal acceleration sensor" are used synonymously in the present description, i.e., it is the same sensor that detects both a longitudinal acceleration as well as a longitudinal inclination of the road surface. This is related to the fact that in the case of acceleration, the force of inertia acts on the sensor and in the case of an inclined road surface, one component of the gravitational force acts on the sensor, which are not differentiable. In the case of an accelerated motion on an inclined road surface, the output signal of the inclination sensor then represents the sum of the force of inertia and (as a result of the inclined road surface) the tangential component of the gravitational force.

An advantageous embodiment is characterized in that a decision is made whether the offset value is determined as a function of the first and second inclination variable. As a result, using only the output signals of the longitudinal acceleration sensor, it is determined whether it is possible or not to determine the offset value.

An advantageous embodiment is characterized in that the offset value is determined if the absolute value of the difference between the first inclination variable and the second inclination variable falls below a specifiable limiting value.

Another advantageous embodiment is characterized in that the first inclination variable is used as an offset value. As a result, only the stored first inclination variable is used, i.e., the determination of the offset value is extremely simple.

An advantageous embodiment is characterized in that the second inclination variable is determined during a standing start of the vehicle, no brake-induced deceleration events and no engine-induced acceleration events having occurred since the vehicle was standing still.

The device according to the present invention for determining the offset value of a longitudinal acceleration sensor that is installable in a vehicle contains inclination detection means, which determine a first inclination variable representing the road surface inclination from the output signal of the longitudinal acceleration sensor when the vehicle is standing still with the brake applied, and determine a second inclination variable representing the road surface inclination and the vehicle acceleration from the output signal of the longitudinal acceleration sensor after the brake is released following the vehicle standstill.

The device also contains offset value detection means, in which the offset value of the longitudinal acceleration sensor is determined as a function of the two inclination variables.

Of course, the advantageous embodiments of the method according to the present invention are also expressed as advantageous embodiments of the device according to the present invention and vice versa.

DETAILED DESCRIPTION

Figure 1:
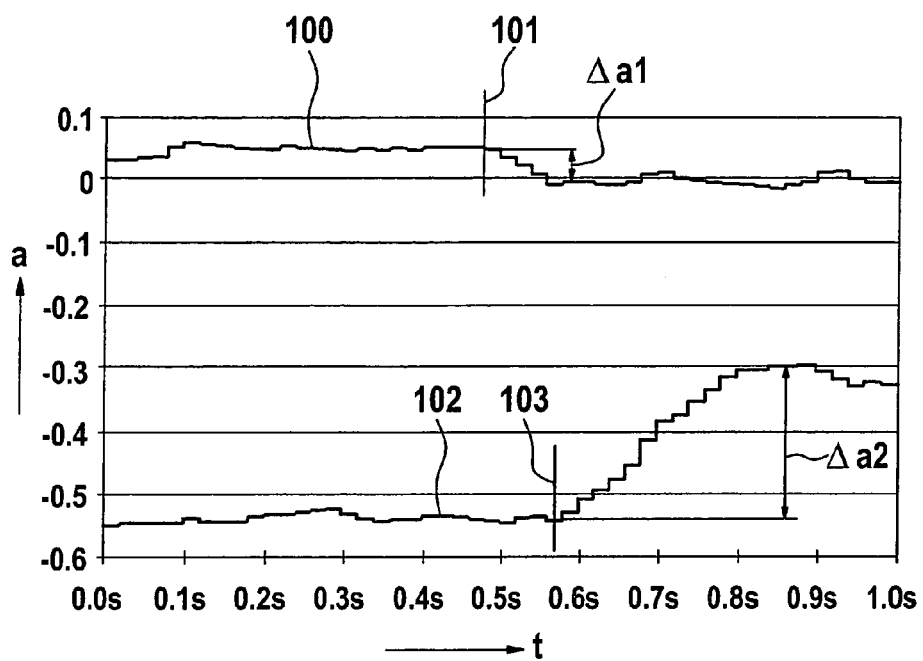
FIG. 1 shows two measured curves of the output signals of the longitudinal acceleration sensor.

Longitudinal acceleration sensors or inclination sensors are used in motor vehicles to determine, for example, the longitudinal inclination of the road surface. If the vehicle is located on a road surface inclined by the angle a in the vehicle's longitudinal direction, component $g*\sin \alpha$ of gravitational acceleration g acts in the vehicle's longitudinal direction. This component is detected by a longitudinal acceleration sensor located in the vehicle, and angle of inclination a of the road surface may therefore be determined from its output signal.

However, the output signal of the longitudinal acceleration sensor frequently has an offset tolerance. This means that a component g*sin α, which is different from zero, is incorrectly determined for a vehicle at rest on a level road surface (α=0). This tolerance (i.e., this offset value of the longitudinal acceleration signal) may, for example, be caused by the aging of the sensor or by temperature factors.

The present invention makes it possible to determine the offset value of a longitudinal acceleration sensor in a simple manner. To that end, vehicle signals are used to determine if the vehicle is on a level (in the vehicle's longitudinal direction) road surface or on an approximately level road surface.

Sensor adjustment (i.e., the determination of the offset value and the resulting correction of its output signal) makes it possible to use a sensor that may be manufactured more cost-effectively as the result of a higher allowable tolerance.

Even a vehicle inclination caused not only by an inclined road surface but also by the loading of the vehicle is considered by the present invention.

The offset value is determined in the following steps:

Initial State:

The vehicle is standing still on an inclined road surface in the vehicle's longitudinal direction and at least one brake (e.g., parking brake) is activated. As a function of the longitudinal inclination of the road surface, a downward force acts on the vehicle in its longitudinal direction. It does not result in vehicle movement because it is compensated by the braking force.

Step 1:

In the initial state of the vehicle, the output signal of the longitudinal acceleration sensor is analyzed. Gradient a1 corresponding to this signal is stored. If the output signal is affected by an offset value, then a1 does not represent the real physical gradient of the road surface but instead the sum of the offset value+the gradient of the road surface.

Step 2:

The brake of the vehicle is released. However, the accelerator pedal is not activated, i.e., no driving force produced by the engine acts on the vehicle. The downward force is no longer compensated by the braking force. It is now possible to differentiate between two cases by analyzing the output signal of the longitudinal acceleration sensor.

Case 1: The vehicle does not start to move, i.e., there is no change of the longitudinal acceleration signal Ú The road surface is detected as being level.

Case 2: The vehicle starts to move, i.e., there is a change of the longitudinal acceleration signal Ú The road surface is detected as being inclined in the vehicle's longitudinal direction.

Step 3:

In the event that a level road surface is detected (output signal of the longitudinal acceleration sensor does not change), it is possible to determine the offset value of the sensor. Since a level road surface is present, the output signal of the sensor must correspond to an inclination of 0 degrees. However, if the output signal does not suggest an inclination of 0 degrees but instead an inclination of 1°, for example, then the sensor has an offset value of 1°. Inclination values measured in the future must be corrected for this value.

Two curves of the output signal of the longitudinal acceleration sensor measured over time are shown in FIG. 1. Time t in seconds is plotted along the x-axis; the longitudinal inclination of the road surface corresponding to the output signal of the longitudinal acceleration sensor is plotted in the direction of the y-axis.

The upper curve (identified by 100) represents the waveform for an approximately level gradient. At point in time 101 (denoted by the vertical line), the brake is released; the output signal of the longitudinal acceleration sensor changes negligibly by the value Da1. This means that the vehicle is located on a level or nearly level road surface. For that reason, the longitudinal acceleration sensor may be adjusted in this case. Lower curve 102 shows the waveform for a gradient of approximately 5%. At point in time 103, the brake is released; the output signal changes significantly by the value Da2. For that reason, no adjustment of the longitudinal acceleration sensor is performed in this case.

The absolute value of variable Da (in FIG. 1, Da assumes the values Da1 and Da2), which if exceeded, no adjustment (i.e., no determination of the offset value) takes place, may of course be selected to have any value.

If this limiting value is selected to be relatively high, the offset value is in fact determined very frequently but at only a low precision. If this limiting value is selected to be very low, the offset value is in fact determined only infrequently but at a greater precision.

Figure 2:
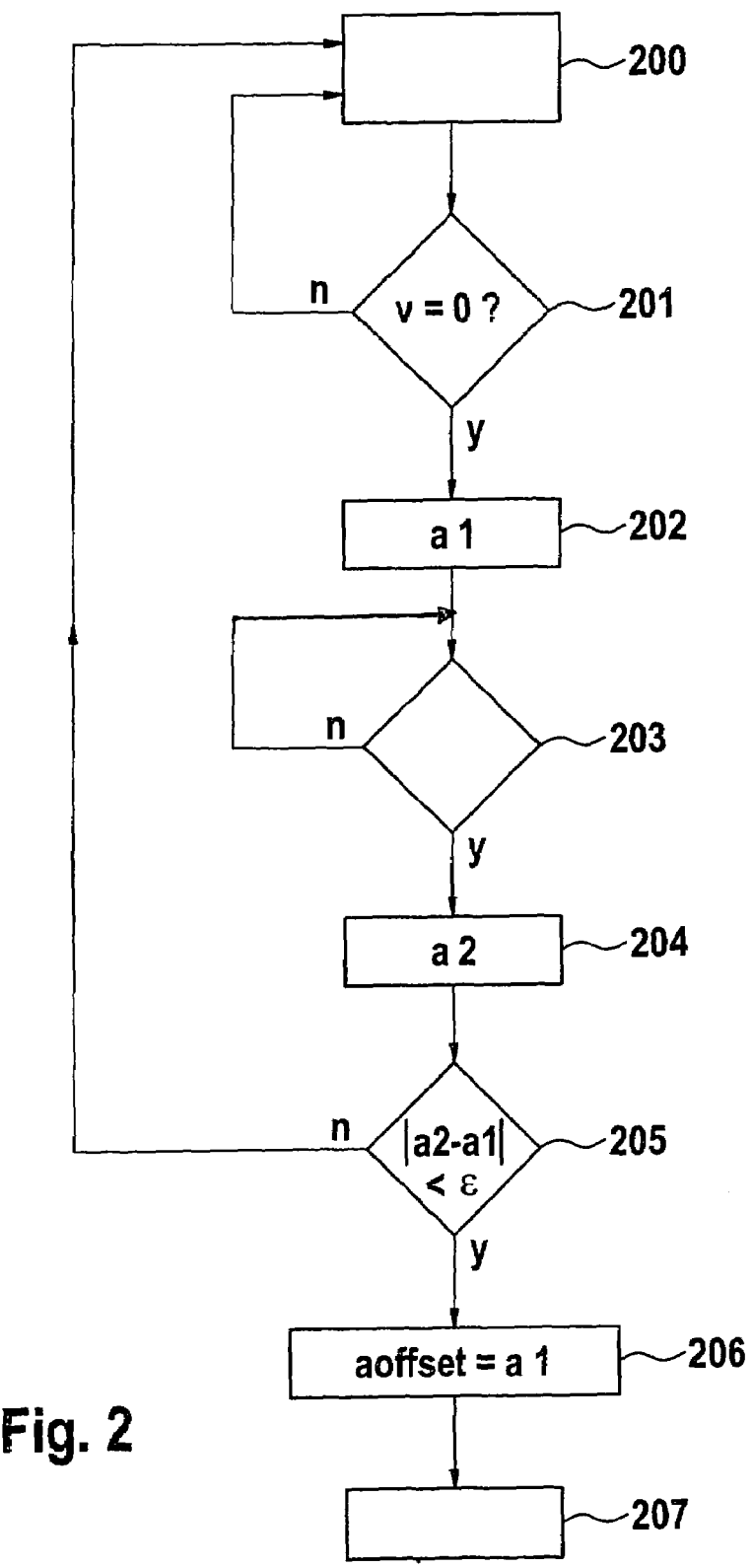
FIG. 2 shows the sequence of operations in one exemplary embodiment of the method of the present invention.

The sequence of operations of one embodiment of the method of the present invention is shown in FIG. 2. After the start in block 200, a query is made in block 201 if the vehicle is standing still, i.e., v=0 is met, and if at least one vehicle brake is applied. v is the longitudinal speed of the vehicle. If the answer is "no" (always denoted as "n" in FIG. 2), the sequence branches back to block 200. If the answer is "yes" (i.e., a standstill is present, always denoted as "y" in FIG. 2), the output signal of the longitudinal acceleration sensor is analyzed in block 202; this produces first inclination variable a1. It is then checked in block 203 if the brake was released. If the answer is "n," the sequence branches back to the input of block 203. If the answer is "y," a second inclination variable a2 is determined in block 204 after the passage of a predetermined interval of time since the brake was released. Following block 204, it is determined in block 205 if it is possible to determine the offset value of the longitudinal acceleration sensor. To this end, it is queried if the amount of the difference of a1 and a2 falls below a predetermined threshold value e.

The query is:

$$|a2-a1|<e?$$

If this query is not met (i.e., the absolute value of the difference is too great), the sequence is branched back to the start of the procedure in block 200 because the standing start is not suitable to determine the offset value. However, if the query in block 205 is met, then offset value aoffset of the longitudinal acceleration sensor is determined in block 206: aoffset=a1.

The inclination variable first determined represents the offset value. This is also entirely and clearly comprehensible because the vehicle does not roll away or hardly rolls away after the brake is released (since $|a2-a1|<e$)

for that reason the vehicle was located on a level or nearly level road surface. The angle of inclination of the level road surface is zero (or approximately zero). Therefore inclination variable a1 must also be zero.

If, however, an inclination variable a1 is determined, which is different from zero, it is not possible for this to be correct, i.e., the inclination variable is the offset value.

The procedure then ends in block 207.

Figure 3:
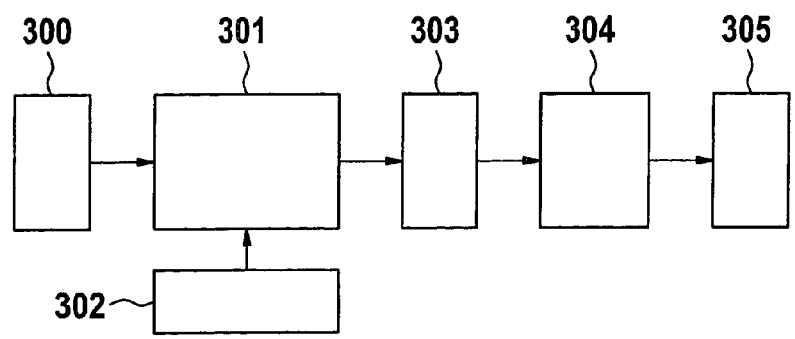
FIG. 3 shows the structure of the device of the present invention in one exemplary embodiment.

The device of the present invention is shown in FIG. 3. Block 300 represents the longitudinal acceleration sensor, which supplies its output signals to inclination detection means 301. Block 302 supplies information concerning the status of the brakes to inclination detection means' 301. To this end, block 302 contains, for example, the brake control unit or means of detection, which display the status of the parking brake. The output signals of block 301 are sent to offset determination means 303, in which the offset value of the longitudinal acceleration sensor is determined. The output signals of block 303 are, for example, passed on to brake control unit 304. The latter contains, for example, the hillholder function. Brake control unit 304 in turn activates brake actuators 305.

What is claimed is:

1. A method for determining an offset value of a longitudinal acceleration sensor that is installable in a vehicle, the vehicle having a brake, the method comprising:

determining a first inclination variable representing a road surface inclination as a function of an output signal of the longitudinal acceleration sensor when the vehicle is standing still with the brake applied;

determining a second inclination variable representing a road surface inclination and a vehicle acceleration as a function of the output signal of the longitudinal acceleration sensor after the brake is released following the vehicle standstill; and determining the offset value of the longitudinal acceleration sensor as a function of the first and second inclination variables.

2. The method according to claim 1, further comprising making a decision, as a function of the first and second inclination variables, whether the offset value is to be determined.

3. The method according to claim 2, wherein the offset value is determined if an absolute value of a difference between the first inclination variable and the second inclination variable falls below a preselected limiting value.

4. The method according to claim 2, wherein the first inclination variable is used as an offset value.

5. The method according to claim 1, wherein the second inclination variable is determined during a standing start of the vehicle, no brake-induced deceleration events and no engine-induced acceleration events having occurred since the vehicle was standing still.

6. A device for determining an offset value of a longitudinal acceleration sensor that is installable in a vehicle, the vehicle having a brake, the device comprising:

inclination detection means for determining a first inclination variable representing a road surface inclination as a function of an output signal of the longitudinal acceleration sensor when the vehicle is standing still with the brake applied, and for determining a second inclination variable representing a road surface inclination and a vehicle acceleration as a function of the output signal of the longitudinal acceleration sensor after the brake is released following the vehicle standstill; and offset value detection means for determining the offset value of the longitudinal acceleration sensor as a function of the first and second inclination variables.

7. The device according to claim 6, wherein the offset value detection means is adapted to make a decision, as a function of the first and second inclination variables, whether the offset value is to be determined.

8. The device according to claim 6, wherein the offset value is determined if an absolute value of a difference between the first inclination variable and the second inclination variable falls below a preselected limiting value.

9. The device according to claim 6, wherein the offset detection means is adapted such that the first inclination variable is used as an offset value.

10. The device according to claim 6, wherein the second inclination variable is determined during a standing start of the vehicle, no brake-induced deceleration events and no engine-induced acceleration events having occurred since the vehicle was standing still.

* * * * *